(12) United States Patent
Birkelbach

(10) Patent No.: US 8,043,021 B2
(45) Date of Patent: Oct. 25, 2011

(54) FASTENING ELEMENT FOR A FRICTION-WELDED JOINT

(75) Inventor: Ralf Birkelbach, Marburg (DE)

(73) Assignee: EJOT GmbH & Co. KG, Bad Laasphe (DE)

( * ) Notice: Subject to any disclaimer, the term of this patent is extended or adjusted under 35 U.S.C. 154(b) by 0 days.

(21) Appl. No.: 12/083,939

(22) PCT Filed: Oct. 13, 2006

(86) PCT No.: PCT/EP2006/009929
§ 371 (c)(1),
(2), (4) Date: Jun. 19, 2008

(87) PCT Pub. No.: WO2007/054178
PCT Pub. Date: May 18, 2007

(65) Prior Publication Data
US 2008/0253829 A1    Oct. 16, 2008

(30) Foreign Application Priority Data
Nov. 9, 2005   (DE) ...................... 20 2005 017 524 U

(51) Int. Cl.
*B25G 3/34*  (2006.01)
*B23K 20/12*  (2006.01)
(52) U.S. Cl. ..................... 403/268; 403/271; 228/112.1; 228/114.5
(58) Field of Classification Search .................... 403/14, 403/268, 271; 411/171; 228/112.1, 114.5
See application file for complete search history.

(56) References Cited

U.S. PATENT DOCUMENTS

| | | | |
|---|---|---|---|
| 6,227,433 B1 | 5/2001 | Waldron et al. | |
| 6,238,121 B1 | 5/2001 | Roser | |
| 2002/0125297 A1* | 9/2002 | Stol et al. | 228/112.1 |
| 2003/0057262 A1 | 3/2003 | Klampfl | |
| 2003/0136810 A1 | 7/2003 | Stevenson et al. | |
| 2006/0213954 A1* | 9/2006 | Ruther et al. | 228/112.1 |

FOREIGN PATENT DOCUMENTS

| | | |
|---|---|---|
| DE | 196 20 814 A1 | 11/1997 |
| DE | 196 42 331 A1 | 4/1998 |
| DE | 198 02 393 A1 | 12/1998 |
| EP | 1 060 823 A1 | 12/2000 |
| EP | 1 250 210 B1 | 10/2002 |
| WO | WO-97/44154 A1 | 11/1997 |

\* cited by examiner

*Primary Examiner* — Victor MacArthur
(74) *Attorney, Agent, or Firm* — Birch, Stewart, Kolasch & Birch, LLP

(57) ABSTRACT

The invention relates to a rotationally symmetrical fastening element with an axially centralized rounded tip for a friction-welded joint with a flat component. The tip is adjoined by a conical lateral surface, the conical lateral surface transitioning into a flute for receiving a material melted during friction-welding, and by a shoulder, wherein the shoulder surrounds the flute, is axially recessed in relation to the tip and transitions into the friction-welded joint.

20 Claims, 4 Drawing Sheets

FASTENING ELEMENT FOR A FRICTION-WELDED JOINT

BACKGROUND OF THE INVENTION

1. Field of the Invention

The invention relates to a rotationally symmetrical fastening element with an axially centralized rounded tip for a friction-welded joint with a flat component.

2. Description of Background Art

Such a fastening element is presented in FIG. 6d of EP 1 250 210 B1. The fastening element consists of a pin with conically tapered end, the tip of which is rounded. For friction-welding, the rounded tip is pressed onto a flat component until, because of the arising heat of friction, the material of the pin and, where applicable, also of the component melts, whereupon, the retaining of the pin and the ensuing cooling of the friction-welding site results in the welded joint with subsequent solidification. The material that melts from the rounded tip is collected by a cup-shaped recess in the flat component, into which recess the tip is rotatingly pressed with strong pressure against the component in order to achieve the friction-welded joint.

A further embodiment of a fastening element used for friction-welding is disclosed in FIGS. 1 and 2 of U.S. Pat. No. 6,227,433 B1, which relate to an especially obtuse-angled tip, which, for the friction-welding operation, is lowered into a flat component, possibly piercing said component and penetrating into a further component, this resulting in a joint between both components, there being no particular place provided to receive the material that melts from the fastening element.

Furthermore, reference may additionally be made to DE 196 20 814 A1, in which a fastening element similar to the fastening element in the aforementioned U.S. Pat. No. 6,227,433 and having an especially obtuse cone angle is brought into engagement with a flat component. Through friction-welding as a consequence of rotation of the fastening element, the latter finally pierces a flat component and thereby comes into contact with a below-lying flat component, this resulting in the welding together of both components in the manner similarly disclosed in the aforementioned U.S. Pat. No. 6,227,433. Also in the subject matter of DE 196 20 814 A1, no special space is provided to receive the melted material.

SUMMARY AND OBJECTS OF THE INVENTION

A pin provided with an obtuse tip is disclosed in FIG. 9 of U.S. Pat. No. 4,850,772. The tip constitutes only a minor elevation in relation to the end face of the pin, with the result that, during the friction-welding operation, the tip quickly penetrates into a flat component, thereafter extensively handing over the friction-welding operation to the radial surface at the front end of the fastening element, which radial surface is substantially larger than the tip.

The object of the invention is to create a fastening element for a friction-welded joint with a flat component wherein any material that is displaced and melts during the friction-welding operation is able to remain in a space, while, at the same time, the fastening element is allowed only an axially limited possibility of movement, this ensuring that the fastening element is unable to penetrate too deeply into a flat component. The object of the invention is achieved by a conical lateral surface adjoining the tip, said conical lateral surface transitioning into a flute for receiving material melted during friction-welding, and by a shoulder, wherein said shoulder surrounds the flute, is axially recessed in relation to the tip and transitions into the friction-welded joint.

Upon its solidification at the end of the friction-welding operation, the melted material that collects in the flute forms the joining means surrounding the remaining portion of the tip, wherein the shoulder concentrically surrounding the flute ensures that the tip cannot penetrate too deeply into the flat component, i.e. while it is received by the flat component, it is unable to pierce it, this being of particular importance for many applications. With regard to the limitation, effected by the shoulder, of the movement of the fastening element during the friction-welding operation, the shoulder is also included in the friction-welding operation, for which the shoulder is preheated by the melting of the tip. The inclusion of the shoulder in the friction-welding operation correspondingly strengthens the friction-welded joint, the tip ensuring the automatic centering of the friction-welding operation, this preventing any drift when the fastening element is brought into engagement and rotated. The result, therefore, is a welded joint that extends across the region from the tip to the shoulder and which has correspondingly great stability.

There are various possibilities with regard to the design of the shoulder. The shoulder may be curved in form; alternatively, the shoulder may also be flat in form.

In order to intensify the friction-welded joint outwardly in the radial direction, there may advantageously be disposed between flute and shoulder an annular projection, said annular projection being convex in cross section. When the fastening element is brought into engagement and rotated, said annular projection becomes heated particularly quickly and therefore supplies melted material in said region both from the fastening element and also from the respective component, this strengthening the friction-welded joint outwardly in the radial direction. There is advantageously disposed between annular projection and shoulder a concentrically circular groove. Said groove then receives melted material from the annular projection and retains said material for the friction-welded joint.

The penetration of the tip of the fastening element into a component can be facilitated in that the conical lateral surface, which surrounds the tip and is tapered towards the flute, is provided in the central region of its axial elevation with a concentric, wave-shaped step. The side of the wave-shaped step facing the tip leads in the region of the tip to a more slender cone angle, this offering correspondingly weaker resistance to the penetration of the tip into a component.

The fastening element may be in the form of either a bolt or a nut. Both designs are of great importance in practice with regard to the attachment of the fastening element to a flat component.

Where the fastening element is in the form of a bolt, the tip with its flute, the annular projection and the shoulder are part of a radial projection projecting from the shank of the bolt, this making it possible to produce a low-cost, standardized unit.

There is a particular possibility for making the cone more slender in the region of the tip in that there is provided a channel directly surrounding the tip, wherein the outer annular wall of said channel transitions into the conical lateral surface. This results in an especially slender tip, which can, accordingly, be easily inserted into a component.

In order to prevent excessive friction between a component and the fastening element, it is possible for the conical lateral surface to be provided with a plurality of axially extending edges. This results in the region of the conical lateral surface in a type of polygon, which, with its axially extending edges, comes into contact only at a small number of sites with the hole that is being formed in a component, this giving rise, owing to the reduced friction during the friction-welding operation, to correspondingly lower thermal loading of the respective component.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 shows a fastening element with a channel directly surrounding the tip;

FIG. 6 shows a variation on the design from FIG. 1 with axially extending edges in the conical lateral surface, in cross section;

FIG. 7 shows the fastening element in the form of a nut; and

FIG. 8 shows the fastening element from FIG. 2, welded to a flat component in the form of a panel.

DETAILED DESCRIPTION OF THE PREFERRED EMBODIMENTS

Figure 1:
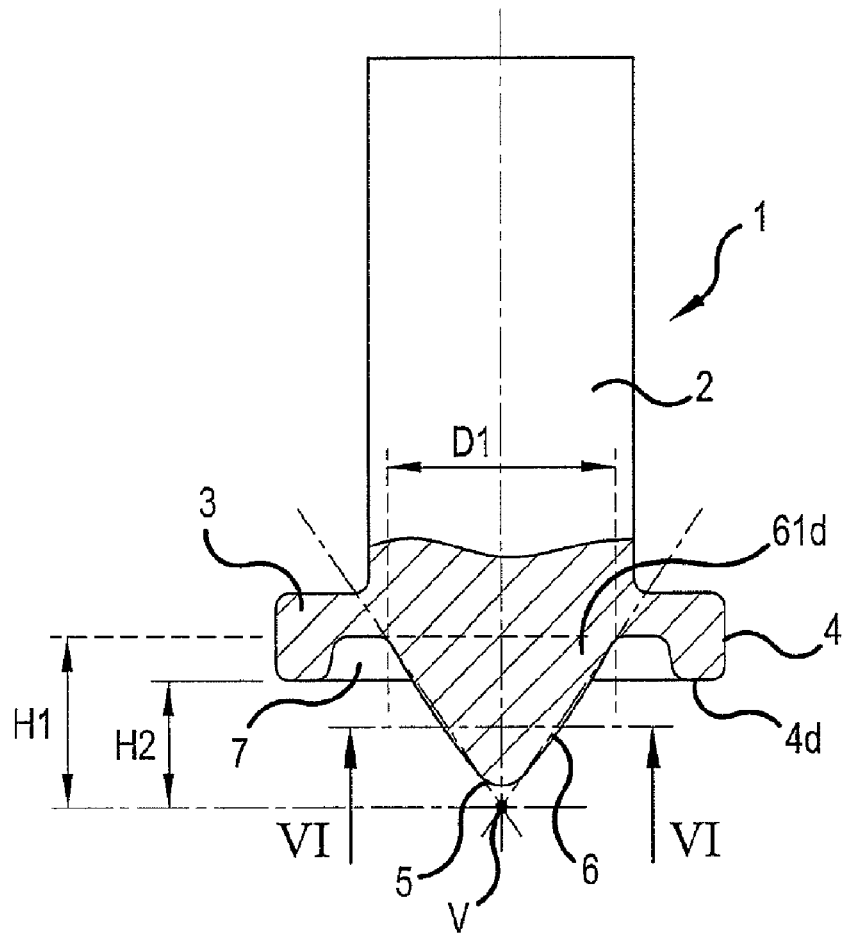
FIG. 1 shows the fastening element with a flute and adjoining flat shoulder.

FIG. 1 presents the rotationally symmetrical fastening element 1, which is in the form of a bolt with the shank 2 having a proximal end and a distal end. The distal end of the shank 2 is adjoined by the radial flange 3, which, in its outer region, forms the flat shoulder 4 and which, at its centre, is provided with a truncated conical lateral surface 6 having a rounded tip 5 on a distal end thereof.

The truncated conical lateral surface 6 includes a large diameter 61d end which transitions into the flute 7. The straight lines 6s1 forming the truncated conical lateral surface 6 intersect at an imaginary vertex V which is located beyond the rounded tip 5. As can been seen in FIG. 1, the truncated conical lateral surface 6 is configured with an axial length H2 between the imaginary vertex V and a distal surface 4d of shoulder 4, and an axial length H1 between vertex V and where the truncated conical lateral surface 6 transitions to the flute 7. In addition, the large diameter end 61d of the truncated conical lateral surface has a dimension D1 perpendicular to an axis of the shank 2 which is greater than each of lengths H1 and H2. Consequently, the flute 7 is situated between the outer end of the truncated conical lateral surface 6 and the shoulder 4. The flute 7 serves to receive material that is melted during the friction-welding operation; this will be discussed in greater detail in connection with FIG. 8.

For friction-welding, the shank 2 is clamped in a suitable tool, which, while being rotated, presses the fastening element 1 against a flat component, whereby said flat component first comes into contact with the rounded tip 5, which is caused to melt in known manner through heating, this constituting the beginning of the friction-welding operation, which will be discussed in greater detail in connection with FIG. 8.

Figure 2:
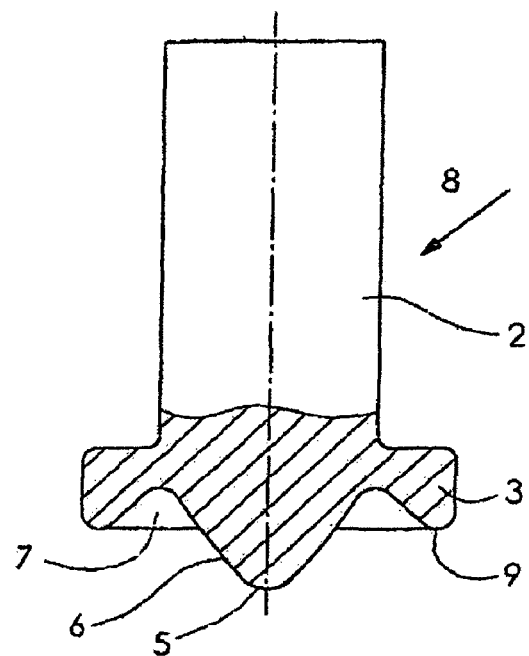
FIG. 2 shows a similar fastening element with a curved shoulder.

FIG. 2 presents a fastening element 8 that is largely identical to the fastening element from FIG. 1, the sole difference being that the shoulder of the fastening element 8 is of different design, being namely in the form of the curved shoulder 9.

Figure 3:
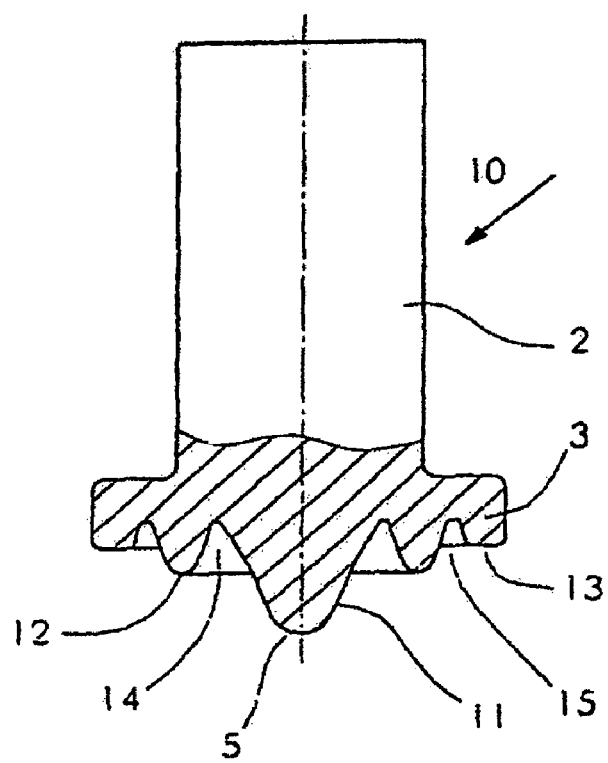
FIG. 3 shows a fastening element with an annular projection provided between flute and shoulder.

FIG. 3 presents a fastening element 10 in which the flute 14 is radially outwardly adjoined by an annular projection 12, which is followed in the outward direction by the concentrically circular groove 15. In the outward direction, the groove 15 is then bordered by the flat shoulder 13. In the inward direction, the flute 14 transitions via the conical lateral surface 11 into the tip 5.

When the fastening element 10 is brought into engagement with a flat component, the tip 5 is first of all melted until the annular projection 12 impacts on the component, whereby, in the outer region of the flange 3, material is melted from the fastening element 10, which material is then able to collect both in the flute 14 and also in the groove 15, in order, upon solidification, to provide an appropriately large extent of the friction-welded joint.

Figure 4:
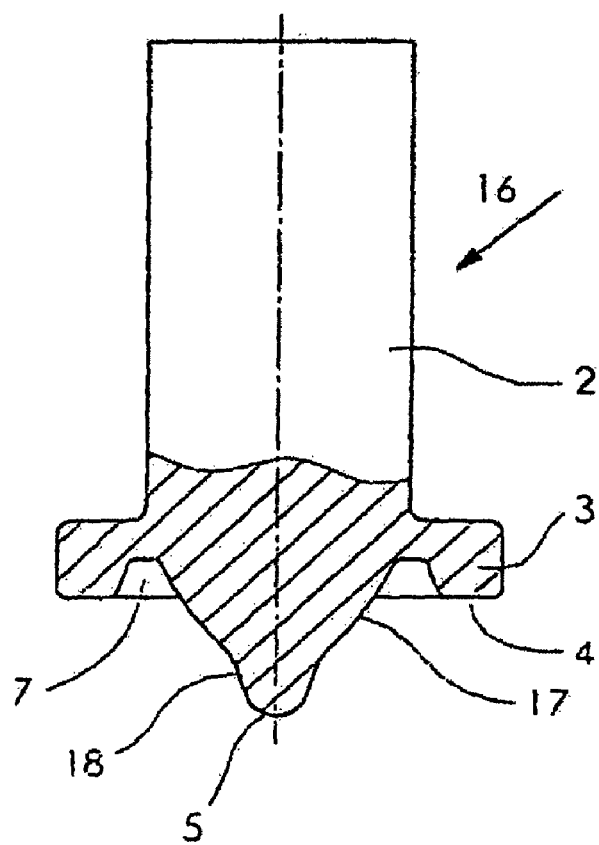
FIG. 4 shows a fastening element with a wave-shaped step in the region of the conical lateral surface.

In the fastening element 16 presented in FIG. 4, there is a particular feature in the region of the conical lateral surface between tip 5 and flute 7, namely the wave-shaped step 17, which concentrically surrounds the tip 5. The step 17 results, directly next to the tip 5, in a correspondingly steeper rise of the conical lateral surface 18 at that place and therefore in a more slender tip 5, this being of advantage in certain applications, particularly where there is a special need for a distinct self-centering force when the fastening element 16 is brought into engagement and rotated.

FIG. 5 presents a fastening element 19 in which, once again, the tip 5 is of more slender design. Disposed around the tip 5 is the channel 20, which closely adjoins the tip 5 and which is then followed in the outward direction by the conical lateral surface 21 and the flute 7. In the embodiment presented in FIG. 5, the channel 20 serves not only to make the tip 5 more slender, but also, in the region closely surrounding the tip 5, to create a reservoir for melted material in the form of the channel 20.

FIG. 6 shows the fastening element 1 in a radial section along line VI-VI from FIG. 1, said fastening element 1 being provided with four rounded edges 23 in the region of the conical lateral surface (24). Owing to the edges, which extend axially over the conical lateral surface 24, there is less friction and therefore reduced thermal loading of the respective component when the fastening element 1 is brought into engagement and rotated.

FIG. 7 shows the fastening element in the form of a nut 25. At one of its ends, said nut 25 has a design that is completely identical to that presented in FIG. 1, with the consequence that, in that respect, reference may be made to FIG. 1. The nut is, as can be seen, provided with the internal thread 26.

FIG. 8 presents the fastening element 8 from FIG. 2 having been welded to the panel 27. As can be seen, there has been formed a friction-welded joint 28 (represented by the cross-hatching), which extends over the entire end face of the fastening element 8, wherein a portion of the fastening element 8 in the region of the tip 5 thereof has been melted away. The friction-welded joint 28 has not pierced the side 29 of the panel 27, although there has been formed between the panel 27 and the fastening element 8 a loading-resistant, strong friction-welded joint 28 extending over the entire end face of the flange 3 of the fastening element 8.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rotationally symmetrical fastening element comprising:
   a shank having a predetermined length, said shank includes a proximal end and a distal end;
   an axially centralized rounded tip formed on the distal end of said shank, said axially centralized rounded tip to be included in a friction-welded joint with a flat component;
   a truncated conical lateral surface adjoining the tip, said truncated conical lateral surface extending a predetermined distance towards the proximal end of the shank;
   a radially extending flange extending outwardly from said shank;
   a shoulder formed at an end of the radially extending flange;
   a flute formed between said radially extending flange and a large diameter end of the conical lateral surface for receiving material melted during formation of the friction-welding joint, wherein said shoulder surrounds the flute, is axially recessed in relation to the tip and is included in the friction-welded joint;
   wherein the truncated conical lateral surface is formed with straight lines which intersect at an imaginary vertex V which is located beyond the rounded tip,
   wherein the truncated conical lateral surface is configured with an axial length H2 between the imaginary vertex V and a distal surface of the shoulder, and an axial length H1 between the imaginary vertex V and where the large diameter end of the truncated conical lateral surface transitions to the flute, and the large diameter end of the truncated conical lateral surface has a dimension D1 perpendicular to an axis of the shank which is greater than the length H1,
   wherein said shoulder limits the movement of the fastening element during formation of the friction-welded joint without penetration through the flat component.

2. Fastening element according to claim 1, wherein the shoulder is curved in form.

3. Fastening element according to claim 2, wherein disposed between flute and shoulder is an annular projection, said annular projection being convex in cross section.

4. Fastening element according to claim 2, wherein the truncated conical lateral surface, which surrounds the tip and is tapered towards the flute, is provided in the central region of its axial elevation with a concentric, wave-shaped step.

5. Fastening element according to claim 2, wherein the flat component is a single flat component, and the friction-welded joint is formed on only one surface of the single flat component without penetration through an opposite surface of the single flat component.

6. Fastening element according to claim 2, wherein a channel directly surrounding the tip, wherein the outer annular wall of said channel transitions into the truncated conical lateral surface.

7. Fastening element according to claim 2, wherein the dimension D1 is greater than the length H2.

8. Fastening element according to claim 1, wherein the shoulder is flat in form.

9. Fastening element according to claim 8, wherein disposed between flute and shoulder is an annular projection, said annular projection being convex in cross section.

10. Fastening element according to claim 8, wherein the truncated conical lateral surface, which surrounds the tip and is tapered towards the flute, is provided in the central region of its axial elevation with a concentric, wave-shaped step.

11. Fastening element according to claim 1, wherein disposed between flute and shoulder is an annular projection, said annular projection being convex in cross section.

12. Fastening element according to claim 11, wherein disposed between annular projection and shoulder is a concentrically circular groove.

13. Fastening element according to claim 1, wherein the truncated conical lateral surface, which surrounds the tip and is tapered towards the flute, is provided in the central region of its axial elevation with a concentric, wave-shaped step.

14. Fastening element according to claim 1, wherein a channel directly surrounding the tip, wherein the outer annular wall of said channel transitions into the truncated conical lateral surface.

15. Fastening element according to claim 1, wherein the truncated conical lateral surface has a plurality of axially extending edges.

16. Fastening element according to claim 1, wherein the fastening element is formed as a bolt.

17. Fastening element according to claim 16, wherein the tip with its flute, the annular projection and the shoulder are constituent parts of a radial flange projecting from the shank of the bolt.

18. Fastening element according to claim 1, wherein the fastening element is formed as a nut.

19. Fastening element according to claim 1, wherein the flat component is a single flat component, and the friction-welded joint is formed on only one surface of the single flat component without penetration through an opposite surface of the single flat component.

20. Fastening element according to claim 1, wherein the dimension D1 is greater than the length H2.

* * * * *